May 5, 1964 K. L. SANDERS 3,131,873
EJECTOR FLAP SYSTEM FOR AIRCRAFT WING WITH DUCTED FAN
Filed July 29, 1963 2 Sheets-Sheet 1

INVENTOR.
KARL L. SANDERS
BY
Knox & Knox

May 5, 1964  K. L. SANDERS  3,131,873
EJECTOR FLAP SYSTEM FOR AIRCRAFT WING WITH DUCTED FAN
Filed July 29, 1963  2 Sheets-Sheet 2
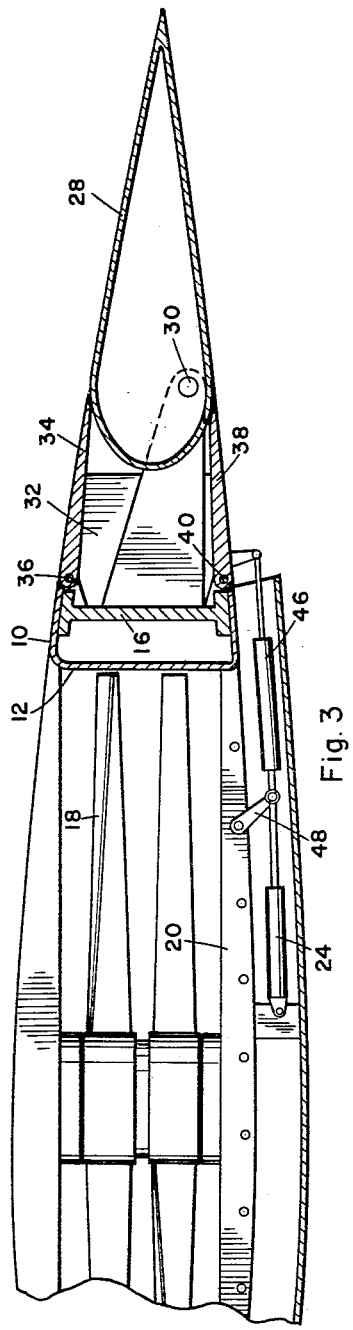
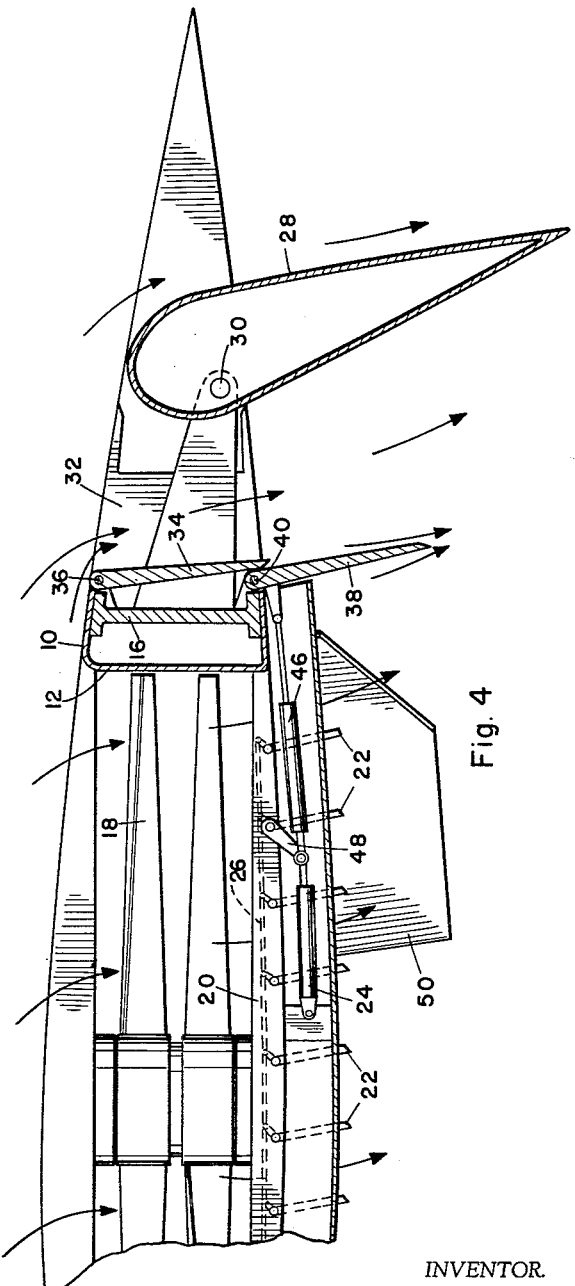
*INVENTOR.*
KARL L. SANDERS
BY
*Knox & Knox*

United States Patent Office 3,131,873
Patented May 5, 1964

3,131,873
EJECTOR FLAP SYSTEM FOR AIRCRAFT WING WITH DUCTED FAN
Karl L. Sanders, La Mesa, Calif., assignor to The Ryan Aeronautical Co., San Diego, Calif.
Filed July 29, 1963, Ser. No. 298,032
8 Claims. (Cl. 244—12)

The present invention relates to aircraft and more specifically to an ejector flap system for an aircraft wing containing a ducted fan.

One type of aircraft capable of vertical take-off and landing has ducted fans submerged in the wings to provide vertical lift by the downward efflux of air from the fans. In transition between vertical and horizontal flight the total lift is composed basically of fan lift, aerodynamic wing lift and a wing fan induced lift derived from the effects of the fan air flow on the wing. The lift can be further enhanced by the use of trailing edge flaps. One problem, however, is the existence of a stagnation zone on the upper surface of the wing immediately aft of the fan duct, which impairs the lift.

The primary object of this invention is to provide an ejector flap system incorporating flap elements which effectively shroud the rear of the fan duct, the fan efflux being controlled in an efficient manner which results in increased lift and the stagnation zone being eliminated by induction from the air flow through the flap system.

Another object of this invention is to provide an ejector flap system in which the fan duct shrouding elements are adjustable to guide the fan efflux and thus improve thrust vector control.

Another object of this invention is to provide an ejector flap system which retracts into the normal aerodynamic contours of the wing and minimizes drag in high speed flight.

The invention consists in the novel combination of elements as described in the specification, pointed out in the claims and illustrated in the drawings, in which:

FIGURE 3 is an enlarged sectional view taken on line 3—3 of FIGURE 1; and

FIGURE 4 is a sectional view similar to FIGURE 3, but showing the flap system in operation.

Similar characters of reference indicate similar or identical elements and portions throughout the specification and throughout the views of the drawing.

General Structure

Figure 1:
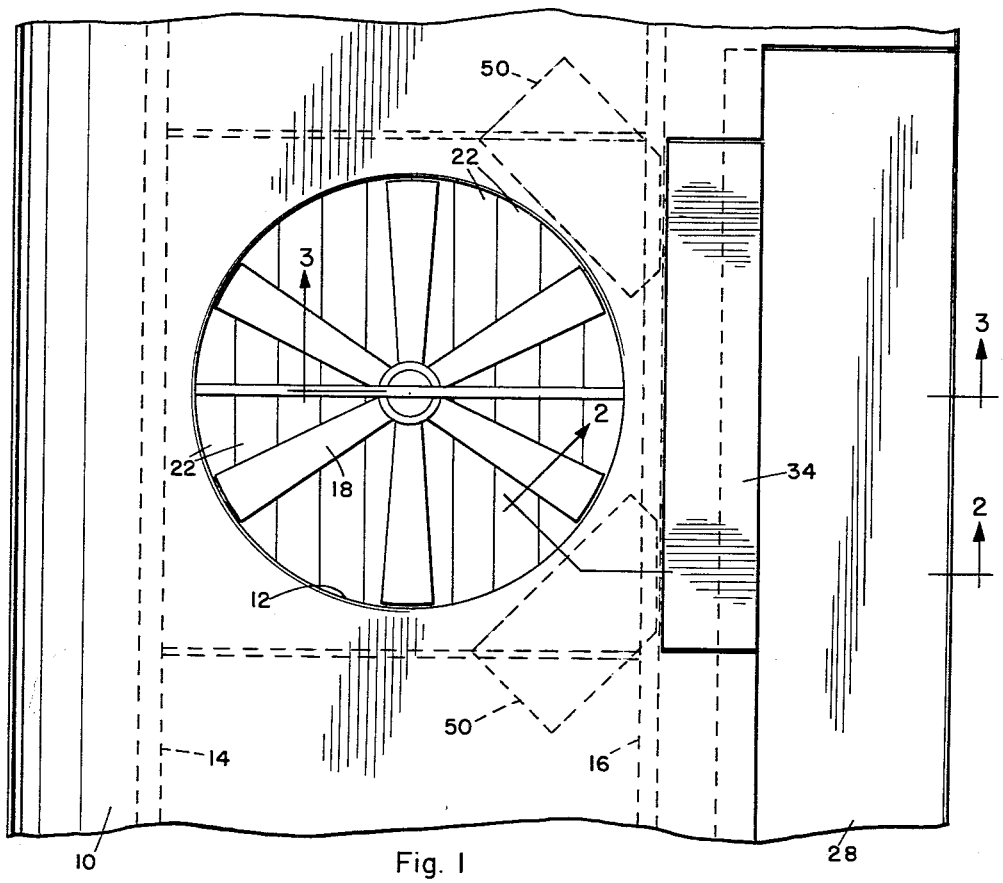
FIGURE 1 is a top plan view of a portion of an aircraft wing incorporating a ducted fan and the ejector flap system.

The specific configuration of the aircraft and the particular wing shape are not critical. The wing 10, as illustrated, is provided with a circular duct 12 extending completely through the wing and being located between the front spar 14 and rear spar 16 of the primary wing structure. Within the duct 12 is mounted a fan 18 rotatable about a vertical axis and driven by any suitable means. Extending from front to rear across the lower end of duct 12 is a lower beam 20 on which a plurality of hinged vanes 22 are mounted, the vanes being disposed across the duct and being actuated collectively by a jack 24 and connecting linkage 26 to swing downwardly, as in FIGURE 4. The general arrangement of this type of ducted fan, the lower control vanes or louvers for directing air flow and closure doors for the duct (not shown) are well known and the structure can vary considerably.

Ejector Flap System

The trailing edge portion of the wing rearwardly of duct 12 comprises a primary flap 28 mounted on hinges 30 adjacent the forward edge of the flap to swing downwardly from the wing in a conventional manner. The primary flap 28 is spaced rearwardly from the rear spar 16 to define a slot 32 therebetween, extending through the thickness of the wing. Slot 32 is closed by an upper flap 34 attached at its forward edge to the top of rear spar 16 by a spanwise hinge 36, and a lower flap 38 similarly attached to the bottom of said rear spar by a hinge 40. The primary flap 28 is actuated by a jack 42, upper flap 34 being actuated by a further jack 44. Lower flap 38 is operated by a jack 46 which is coupled to the jack 24 at the bellcrank 48 which moves vanes 22. Thus the jack 24 can operate vanes 22 and the lower flap 38 simultaneously, or the lower flap can be operated independently by jack 46. The jacks can be any suitable type of linear actuators depending on the power sources or services available in the aircraft. Primary flap 28 can extend spanwise beyond either side of duct 12, as indicated in FIGURE 1, to act as a conventional high lift flap. The slot structure can occupy only a portion of the flap length, as illustrated, or may extend the full length of the flap, depending on the aerodynamic requirements of the particular aircraft.

Figure 2:
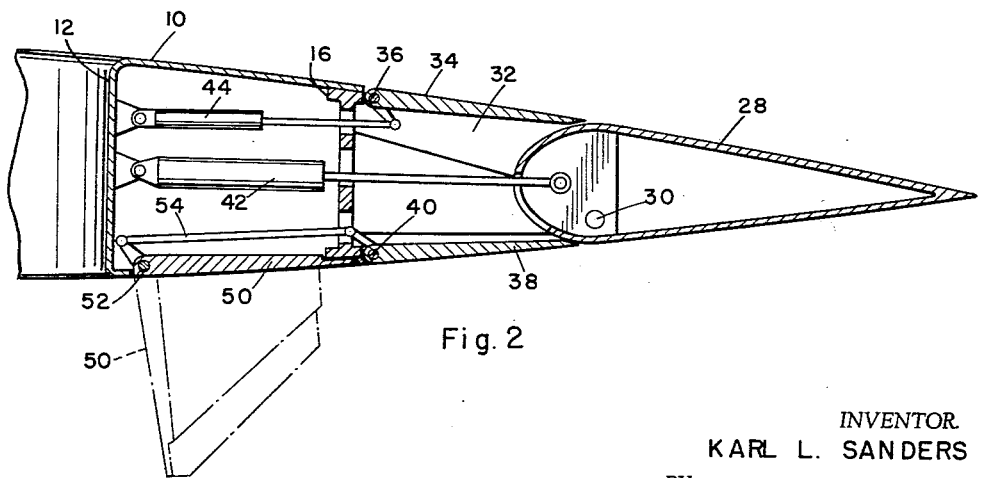
FIGURE 2 is an enlarged fragmentary sectional view taken on line 2—2 of FIGURE 1.

On the underside of wing 10, forward of rear spar 16, are shroud flaps 50 extending angularly forwardly on opposite sides of duct 12. The shroud flaps 50 are attached to the wing at their forward edges by hinges 52 substantially tangential to the periphery of duct 12, and are coupled to the lower flap 38 by connecting links 54, as in FIGURE 2, to extend simultaneously therewith.

Operation

In the vertical take-off position, the vanes 22 are fully open to deflect the fan air flow downwardly, so that the aircraft is lifted vertically. In preparing for transition to forward flight the lower flap 38 and shroud flaps 50 are lowered to shroud the rear of the fan efflux. The primary flap 28 is then lowered, followed by upper flap 34 which opens the slot 32. By inclining the vanes 22 to the rear the fan airflow is deflected, causing the aircraft to move forwardly, this operation being conventional in ducted fan systems. Simultaneously the lower flap 38 and shroud flaps 50 are inclined with vanes 22 to direct the fan efflux effectively by the shrouding structure. Air flow through the duct 12 entrains air flow down through slot 32 between the primary flap 28 and lower flap 38 in the manner of slotted flap, as indicated by directional arrows in FIGURE 4. The air flow downwardly through slot 32, induced by the fan air flow, draws air from the zone of stagnation which is in the vicinity of the upper end of said slot, so relieving the stagnation zone and increasing the overall flow efficiency.

As forward speed increases the primary flap 28 becomes more effective as a high lift flap, and the flow through the ejector type slot 32, coupled with the shrouding of the fan efflux, continues to enhance lift and guide the air flow in the most efficient manner. It should be noted that the lowered upper flap 34 provides a smooth forward wall for slot 32 by enclosing the rear spar structure. As mentioned above, the lower flap elements shrouding the fan efflux can be operated by jack 24 simultaneously with vanes 22 to direct air flow during transition flight, but are independently operable at all times by jack 46 if necessary.

In full forward flight all of the flaps are retracted and fit into the normal airfoil contours, so providing a smooth wing for high speed flight, as in FIGURE 3. The particular arrangement of flaps makes it a simple matter to design the structure to reduce surface gaps to a minimum in the retracted position.

The system increases lift and fan efficiency during vertical flight and through transition phases. By individual adjustment of the primary flap and lower flaps the cross sectional area of slot 32 can be varied to adjust flow for a wide range of operating conditions.

It is understood that minor variation from the form of the invention disclosed herein may be made without departure from the spirit and scope of the invention, and that the specification and drawings are to be considered as merely illustrative rather than limiting.

I claim:

1. In combination with an aircraft wing having a duct therethrough forwardly of the trailing edge of the wing, and a lifting fan operatively mounted in said duct, an ejector flap system, comprising:
   a lower flap pivotally attached to the lower surface of said wing to swing downwardly therefrom immediately rearwardly of said duct;
   a primary flap in the trailing edge of said wing, spaced rearwardly of said duct, and hinged to swing downwardly and define a slot through the wing between the duct and said primary flap.

2. In combination with an aircraft wing having a duct therethrough forwardly of the trailing edge of the wing, and a lifting fan operatively mounted in said duct, an ejector flap system, comprising:
   a lower flap pivotally attached to the lower surface of said wing to swing downwardly therefrom immediately rearwardly of said duct;
   a primary flap in the trailing edge of said wing, spaced rearwardly of said duct, and hinged to swing downwardly and define a slot through the wing between the duct and said primary flap;
   and an upper flap pivotally mounted in the upper surface of said wing to swing downwardly and form the forward wall of said slot.

3. In combination with an aircraft wing having a duct therethrough forwardly of the trailing edge of the wing, and a lifting fan operatively mounted in said duct, an ejector flap system, comprising:
   a plurality of lower flaps pivotally attached to the lower surface of said wing adjacent the rear portion of said duct to swing downwardly and shroud the rear of the duct;
   a primary flap in the trailing edge of said wing, spaced rearwardly of said lower flaps, and hinged to swing downwardly and define a slot through the wing between the lower flaps and said primary flap.

4. In combination with an aircraft wing having a duct therethrough forwardly of the trailing edge of the wing, and a lifting fan operatively mounted in said duct, an ejector flap system, comprising:
   a plurality of lower flaps pivotally attached to the lower surface of said wing adjacent the rear portion of said duct to swing downwardly and shroud the rear of the duct;
   a primary flap in the trailing edge of said wing, spaced rearwardly of said lower flaps, and hinged to swing downwardly and define a slot through the wing between the lower flaps and said primary flap;
   and an upper flap pivotally mounted in the upper surface of said wing forwardly of said primary flap to swing downwardly into said slot;
   said primary flap, upper flap and lower flaps having closed positions within the airfoil contours of said wing and constituting surface portions of the wing.

5. In combination with an aircraft wing having a duct therethrough forwardly of the trailing edge of the wing, and a lifting fan operatively mounted in said duct, an ejector flap system, comprising:
   a lower flap pivotally attached to the lower surface of said wing to swing downwardly therefrom immediately rearwardly of said duct;
   shroud flaps pivotally mounted in the lower surface of said wing forwardly of said lower flap and on opposite sides of said duct;
   said shroud flaps being interconnected with said lower flap to swing downwardly therewith and shroud the rear portion of said duct;
   a primary flap in the trailing edge of said wing, spaced rearwardly of said lower flap, and hinged to swing downwardly and define a slot through the wing between the lower flap and said primary flap;
   and an upper flap pivotally mounted in the upper surface of said wing forwardly of said primary flap to swing downwardly into said slot and form the forward wall thereof.

6. The combination according to claim 5, wherein said upper and lower flaps in a closed position enclose said slot.

7. In combination with an aircraft wing having a duct therethrough forwardly of the trailing edge of the wing, a lifting fan operatively mounted in said duct, a plurality of substantially spanwise vanes pivotally mounted in the lower end of said duct, and actuating means connected to move said vanes collectively, an ejector flap system, comprising:
   a lower flap pivotally mounted in the lower surface of said wing immediately rearwardly of said duct and being coupled to said actuating means to swing downwardly with said vanes;
   a primary flap in the trailing edge of said wing, spaced rearwardly of said lower flap, and hinged to swing downwardly and define a slot through the wing between the lower flap and said primary flap;
   and an upper flap pivotally mounted in the upper surface of said wing to swing downwardly into said slot forwardly of said primary flap.

8. The combination according to claim 7 and including further actuating means connected between said first mentioned actuating means and said lower flap, for selective operation of the lower flap independently of said vanes.

References Cited in the file of this patent

UNITED STATES PATENTS

| | | |
|---|---|---|
| 2,990,138 | Shaw | June 27, 1961 |
| 3,056,565 | Griffith | Oct. 2, 1962 |
| 3,080,137 | Hurel | Mar. 5, 1963 |